(12) United States Patent
Larson

(10) Patent No.: US 9,233,484 B2
(45) Date of Patent: Jan. 12, 2016

(54) SPRAY DEVICE AND USE THEREOF

(75) Inventor: John Charles Larson, West Chester, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 1025 days.

(21) Appl. No.: 13/379,079

(22) PCT Filed: Jun. 24, 2010

(86) PCT No.: PCT/US2010/039818
§ 371 (c)(1),
(2), (4) Date: Dec. 19, 2011

(87) PCT Pub. No.: WO2010/151666
PCT Pub. Date: Dec. 29, 2010

(65) Prior Publication Data
US 2012/0097764 A1     Apr. 26, 2012

Related U.S. Application Data

(60) Provisional application No. 61/220,346, filed on Jun. 25, 2009.

(51) Int. Cl.
*B05B 9/00* (2006.01)
*B29B 7/74* (2006.01)
(Continued)

(52) U.S. Cl.
CPC .............. *B29B 7/7452* (2013.01); *B05B 7/061* (2013.01); *B05B 7/12* (2013.01); *B05B 7/129* (2013.01); *B05B 7/2472* (2013.01); *B05B 7/2478* (2013.01); *B05B 7/066* (2013.01)

(58) Field of Classification Search
CPC .......... B05B 1/16; B05B 1/1627; B05B 7/12; B05B 7/129; B05B 7/066; B05B 7/08; B05B 7/0807; B05B 7/0838; B05B 7/2472; B05B 7/7452; B05B 7/061
USPC ........ 239/303, 690–708, 99, 101, 3; 250/281, 250/282, 288
See application file for complete search history.

(56) References Cited

U.S. PATENT DOCUMENTS 2,958,471 A * 11/1960 Zippel .......................... 239/414
3,066,874 A    12/1962 Becker
(Continued)

FOREIGN PATENT DOCUMENTS

EP    0105493 A2    4/1984
GB    842959 A      8/1960
(Continued)

OTHER PUBLICATIONS

ISA EPO, International Search Report for International Application No. PCT/US2010/039818, dated Oct. 13, 2010.
(Continued)

*Primary Examiner* — Arthur O Hall
*Assistant Examiner* — Viet Le
(74) *Attorney, Agent, or Firm* — Ingrassia Fisher & Lorenz, P.C.

(57) ABSTRACT

This invention is directed to a method for producing a coating layer of a coating composition comprising two or more components. The two or more components are mixed post atomization. This invention is also directed to a spray gun having a spray needle comprising two or more spray channels for producing such coating layer.

13 Claims, 8 Drawing Sheets

(51) Int. Cl.
  *B05B 7/06* (2006.01)
  *B05B 7/12* (2006.01)
  *B05B 7/24* (2006.01)

(56) References Cited

U.S. PATENT DOCUMENTS

| | | | | |
|---|---|---|---|---|
| 3,122,326 | A | * | 2/1964 | Cook .............................. 239/401 |
| 4,523,696 | A | * | 6/1985 | Commette et al. ............. 222/135 |
| 4,824,017 | A | | 4/1989 | Mansfield |
| 4,955,544 | A | * | 9/1990 | Kopp ............................. 239/304 |
| 6,815,501 | B2 | | 11/2004 | Flosbach et al. |
| 7,201,289 | B2 | | 4/2007 | Bhatia |

FOREIGN PATENT DOCUMENTS

| | | |
|---|---|---|
| WO | 2005092934 A1 | 10/2005 |
| WO | 2010050998 A1 | 5/2010 |
| WO | 2010075486 A1 | 7/2010 |
| WO | 2010151719 A1 | 12/2010 |
| WO | 2010151766 A1 | 12/2010 |
| WO | 2011100003 A1 | 8/2011 |

OTHER PUBLICATIONS

ISA EPO, International Preliminary Report on Patentability for International Application No. PCT/US2010/039818, dated Jan. 12, 2012.

* cited by examiner

SPRAY DEVICE AND USE THEREOF

CROSS-REFERENCE TO RELATED APPLICATIONS

This application is a U.S. National-Stage entry under 35 U.S.C. 371 based on International Application No. PCT/US2010/039818, filed Jun. 24, 2010, which was published under PCT Article 21(2) and which claims priority from U.S. Provisional Application Serial No. 61/220,346 (filed Jun. 25, 2009), the disclosure of which is incorporated by reference herein for all purposes as if fully set forth.

FIELD OF INVENTION

The present invention is directed to a method for producing coating layer with a coating composition. This invention is specifically directed to a method and a spray device for producing an atomized stream of a coating composition having multiple components.

BACKGROUND OF INVENTION

Coatings on automotives or other objects typically comprise polymer networks formed by multiple reactive components of a coating composition. The coatings are typically applied onto a substrate such as automobile vehicle body or body parts using a spray device or other coating application techniques and then cured to form a coating layer having such polymer networks.

Currently, the multiple reactive components of the coating composition are typically mixed together to form a pot mix prior to spraying and placed in a cup-like reservoir or container that is attached to a spraying device such as a spray gun. Due to the reactive nature of the multiple reactive components, the pot mix will start to react as soon as they are mixed together causing continued increase in viscosity of the pot mix. Once the viscosity reaches a certain point, the pot mix becomes practically un-sprayable. The possibility that the spray gun itself may become clogged with crosslinked polymer materials is also disadvantageous. The time it takes for the viscosity to increase to such point where spraying becomes ineffective, generally a two-fold increase in viscosity, is referred to as "pot life".

One way to extend "pot life" is to add a greater amount of thinning solvent, also known as thinning agent, to the pot mix. However, thinning agent, such as organic solvent, contributes to increased emissions of volatile organic compounds (VOC) and also increases curing time.

Other attempts to extend "pot life" of a pot mix of a coating composition have focused on "chemical-based" solutions. For example, it has been suggested to include modifications of one or more of the reactive components or certain additives that would retard polymerization reaction of the multiple components in the pot mix. The modifications or additives must be such that the rate of curing is not adversely affected after the coating is applied to the surface of a substrate.

Another approach is to mix one or more key components, such as a catalyst together with other components of the coating composition immediately prior to spraying. One example is described in U.S. Pat. No. 7,201,289 in that a catalyst solution is stored in a separate dispenser and being dispensed and mixed with a liquid coating formulation before the coating formulation is atomized.

Yet another approach is to separately atomize two components, such as a catalyst a resin, of a coating composition, and mix the two atomized components after spray. One such example is described in U.S. Pat. No. 4,824,017. However, such approach requires atomization of two components separately by using separate pumps and injection means for each of the two components.

STATEMENT OF INVENTION

This invention is directed to a spray gun for spraying a coating composition comprising a first component and a second component, said spray gun comprising;
(A) a spray gun body (1) comprising a carrier inlet (12) for conveying a carrier, a first inlet (10) connected to a first connection path for conveying the first component, and a second inlet (8) connected to a second connection path for conveying the second component;
(B) a tubular nozzle casing (55) having a longitudinal casing axis and a nozzle (13), said tubular nozzle casing being housed within said spray gun body; and
(C) a spray needle (56) comprising a first spray channel having a longitudinal first channel axis and a first channel opening, and a second spray channel having a longitudinal second channel axis and a second channel opening, said spray needle being housed within said tubular nozzle casing and being configured to slide between a spray position and a closed position, said first channel opening and said second channel opening being positioned adjacent to each other at said nozzle; wherein:
said longitudinal casing axis, said longitudinal first channel axis and said longitudinal second channel axis are substantially parallel to each other; and
said first spray channel is configured to connect to said first connection path and said second spray channel is configured to connect to said second connection path, when said spray needle is at said spray position, for conveying said first and said second component separately to said nozzle.

This invention is also directed to a method for producing a layer of a coating composition comprising a first component and a second component on a substrate, said method comprising the steps of:
i) providing a spray gun comprising:
(A) a spray gun body (1) comprising a carrier inlet (12) for conveying a carrier, a first inlet (10) connected to a first connection path for conveying the first component, and a second inlet (8) connected to a second connection path for conveying the second component;
(B) a tubular nozzle casing (55) having a longitudinal casing axis and a nozzle (13), said tubular nozzle casing being housed within said spray gun body; and
(C) a spray needle (56) comprising a first spray channel having longitudinal first channel axis and a first channel opening, and a second spray channel having a longitudinal second channel axis and a second channel opening, said spray needle being housed within said tubular nozzle casing and being configured to slide between a spray position and a closed position, said first channel opening and said second channel opening being positioned adjacent to each other at said nozzle; wherein:
said longitudinal casing axis, said longitudinal first channel axis and said longitudinal second channel axis are substantially parallel to each other; and
said first spray channel is configured to connect to said first connection path and said second spray channel is configured to connect to said second connection path, when said spray needle is at said spray position, for conveying said first and said second component separately to said nozzle;

ii) providing the first component of said coating composition to the first inlet and the second component of said coating composition to said second inlet;

iii) producing atomized said first component anatomized said second component to form an atomized coating mixture by supplying a pressurized carrier to said carrier outlet through said carrier inlet and sliding said spray needle to said spray position; and iv) applying said atomized coating mixture over said substrate forming said layer thereon.

DETAILED DESCRIPTION

Figure 1:
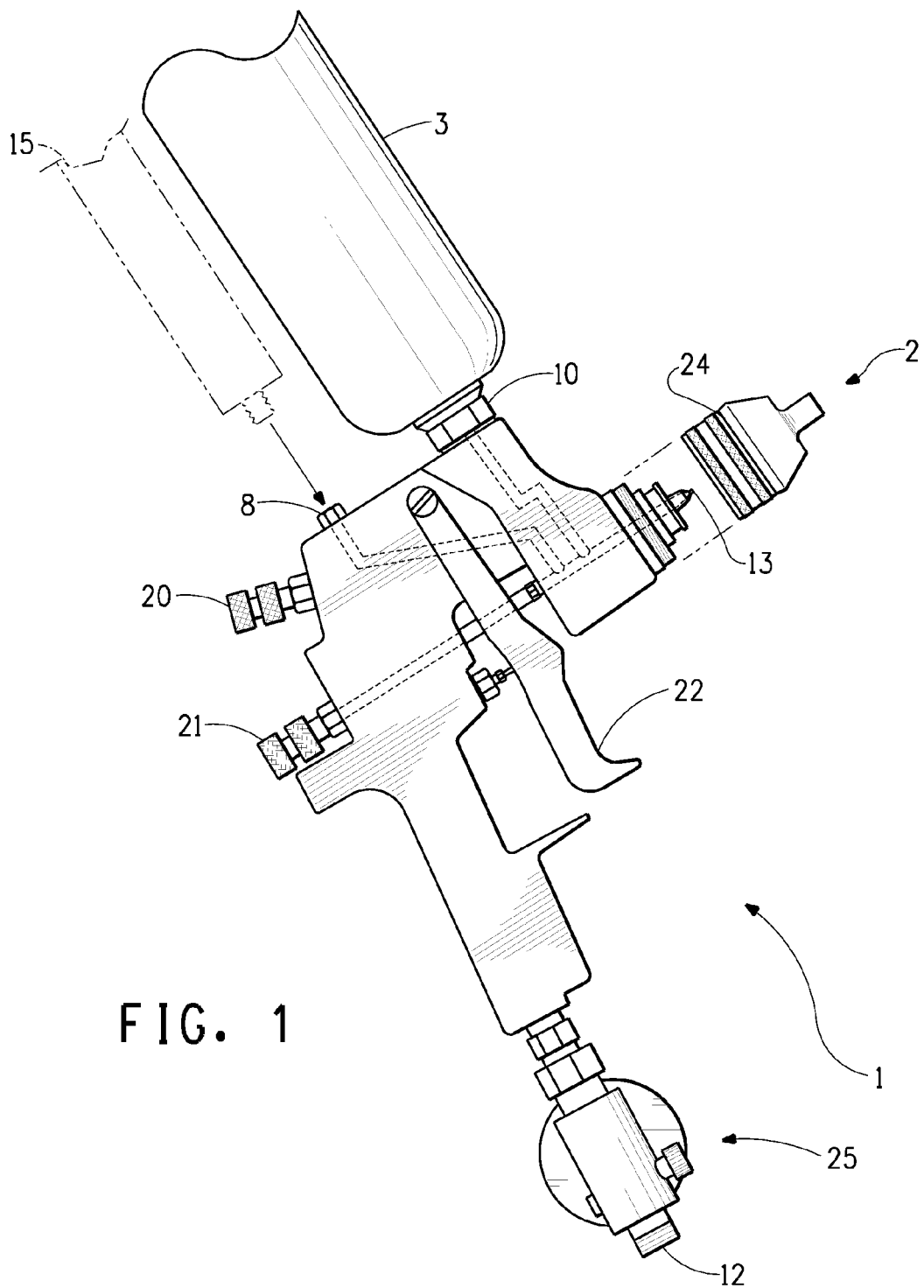
FIG. 1 shows a schematic presentation of an example of a spray gun of this invention.
Figure 2:
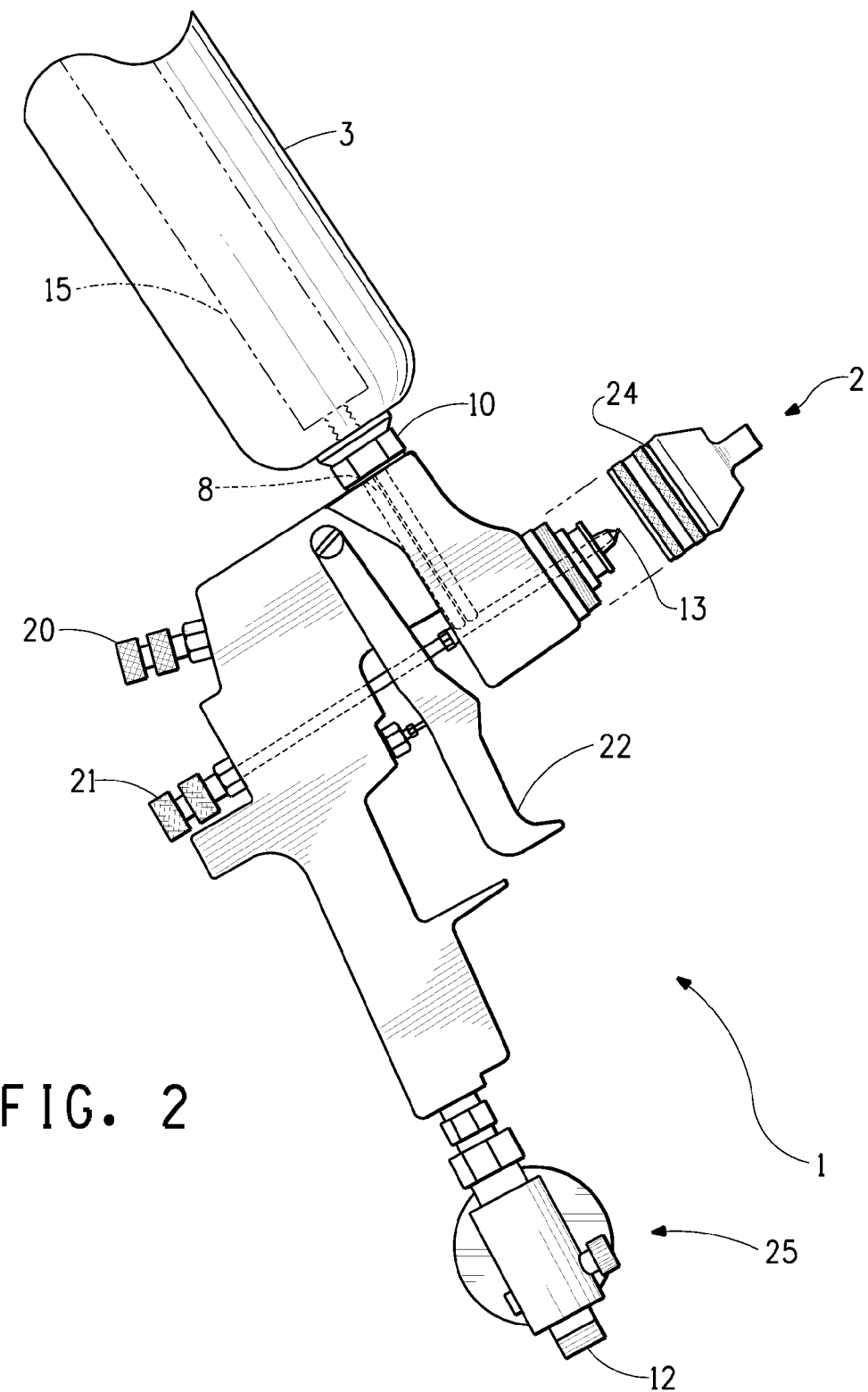
FIG. 2 shows another schematic presentation of an example of a spray gun of this invention.

The features and advantages of the present invention will be more readily understood, by those of ordinary skill in the art, from reading the following detailed description. It is to be appreciated that certain features of the invention, which are, for clarity, described above and below in the context of separate embodiments, may also be provided in combination in a single embodiment. Conversely, various features of the invention that are, for brevity, described in the context of a single embodiment, may also be provided separately or in any sub-combination. In addition, references in the singular may also include the plural (for example, "a" and "an" may refer to one, or one or more) unless the context specifically states otherwise.

The use of numerical values in the various ranges specified in this application, unless expressly indicated otherwise, are stated as approximations as though the minimum and maximum values within the stated ranges were both proceeded by the word "about." In this manner, slight variations above and below the stated ranges can be used to achieve substantially the same results as values within the ranges. Also, the disclosure of these ranges is intended as a continuous range including every value between the minimum and maximum values.

As used herein:

"Two-pack coating composition", also known as 2K coating composition, means a thermoset coating composition comprising two components that are stored in separate containers, which are typically sealed for increasing the shelf life of the components of the coating composition. The components are mixed just prior to use to form a pot mix, which has a limited pot life, typically from few minutes, such as 15 minutes to 45 minutes, to few hours, such as 4 hours to 10 hours. The pot mix is applied as a layer of desired thickness on a substrate surface, such as the body or body parts of a vehicle. After application, the layer dries and cures to form a coating on the substrate surface having desired coating properties, such as, desired gloss, mar-resistance, resistance to environmental etching and resistance to degradation by solvent. A typical two-pack coating composition can comprise a crosslinkable component and a crosslinking component.

"One-Pack coating composition", also known as 1K coating composition, means a coating composition comprises multiple ingredients mixed in one single package. A one-pack coating composition can forme coating layer under certain conditions. One example of 1K coating composition can comprise a blocked crosslinking agent that can be activated under certain conditions. One example of the blocked crosslinking agent can be a blocked isocyanate. Another example of 1K coating composition can be a ultraviolet (UV) radiation curable coating composition.

The term "radiation", "irradiation" or "actinic radiation" means radiation that causes, in the presence of a photo initiator, polymerization of monomers that have polymerizable ethylenically unsaturated double bonds, such as acrylic or methacrylic double bonds. Sources of actinic radiation may be natural sunlight or artificial radiation sources. Examples of actinic radiation include, but not limited to, UV radiation that has radiation wavelength in a range of from 100 nm to 800 nm, UV-A radiation, which falls within the wavelength range of from 320 nanometers (nm) to 400 nm; radiation, which is radiation having a wavelength failing in the range of from 280 nm to 320 nm; UV-C radiation, which is radiation having a wavelength falling in the range of from 100 nm to 280 nm; and UV-V radiation, which is radiation having a wavelength falling in the range of from 400 nm to 800 nm. Other examples of radiation can include electron-beam, also known as e-beam. A coating curable by radiation, such as UV, can be referred to as a radiation coating or a UV coating. A UV coating can be typically a 1K coating. A UV curable coating can typically have a UV curable component comprising monomers that have polymerizable ethylenically unsaturated double bonds, such as acrylic or methacrylic double bonds; and one or more photo initiators or radiation activators. Typically, a 1K coating composition, for example a UV mono-cure coating composition, can be prepared to form a pot mix and stored in a sealed container. As long as said UV mono-cure coating composition is not exposed to UV radiation, said UV mono-cure coating composition can have indefinite pot life.

A coating that can be cured by one curing mechanism, such as by chemical crosslinking alone or by UV radiation alone, can be referred to as a mono-cure coating. A coating that can be cured by both chemical and radiation, such as by both chemical crosslinking and UV radiation, is referred to as a dual-cure coating.

In one example, a dual-cure coating composition contains a first component having both radiation curable groups, such as acrylic double bonds, and chemical crosslinkable groups, such as hydroxyl groups, in one container. A second component contains a corresponding crosslinking agent having crosslinking groups, such as isocyanate groups and is stored in a second container. Just prior to use, the first component and the second component are mixed to form a pot mix. U.S. Pat. No. 6,815,501, for example, discloses a dual-cure type UV curable coating composition comprising a radiation curable component having polymerizable ethylenically unsaturated double bonds and a crosslinkable component having hydroxyl functional groups that can be cured by a combination of UV radiation and crosslinking component having isocyanate crosslinking agents. The crosslinkable component of a dual-cure coating composition can have other crosslinkable functional groups described herein. The crosslinking component of a dual-cure coating composition can have other crosslinking functional groups described herein.

"Low VOC coating composition" means a coating composition that includes less than 0.6 kilograms per liter (5 pounds per gallon), preferably less than 0.53 kilograms (4.4 pounds per gallon) of volatile organic component, such as certain organic solvents. The phrase "volatile organic component" is herein referred to as VOC. VOC level is determined under the procedure provided in ASTM D3960.

"Crosslinkable component" includes a compound, oligomer, polymer or copolymer having functional crosslinkable groups positioned in each molecule of the compound, oligomer, the backbone of the polymer, pendant from the backbone of the polymer, terminally positioned on the backbone of the polymer, or a combination thereof. One of ordinary skill in the art would recognize that certain crosslinkable group combinations would be excluded from the crosslinkable component of the present invention, since, if present, these combinations would crosslink among themselves (self-crosslink), thereby destroying their ability to crosslink with the crosslinking groups in the crosslinking components defined below.

Typical crosslinkable component can have on an average 2 to 25, preferably 2 to 15, more preferably 2 to 5, even more preferably 0.2 to 3, crosslinkable groups selected from hydroxyl, acetoacetoxy, carboxyl, primary amine, secondary amine, epoxy, anhydride, imino, ketimine, aldimine, or a combination thereof.

The crosslinkable component can have protected crosslinkable groups. The "protected" crosslinkable groups are not immediately available for curing with crosslinking groups, but first must undergo a reaction to produce the crosslinkable groups. Examples of suitable protected crosslinkable components having protected crosslinkable groups can include, for example, amide acetal, orthocarbonate, orthoacetate, orthoformate, spiroorthoester, orthosilicate, oxazolidine or combinations thereof.

The protected crosslinkable groups generally are not crosslinkable without an additional chemical transformation. The chemical transformation for these groups can be a deprotection reaction such as hydrolysis reaction that unprotects the group to form a crosslinkable group that can then be reacted with the crosslinking component to produce a crosslinked network. Each one of these protected groups, upon the deprotection reaction, forms at least one crosslinkable group. For example, upon hydrolysis, an amide acetal can form an amide diol or one of two amino alcohols. As another example, the hydrolysis of an orthoacetate can form a hydroxyl group.

The crosslinkable component can contain compounds, oligomers and/or polymers that have crosslinkable functional groups that do not need to undergo a chemical reaction to produce the crosslinkable group. Such crosslinkable groups are known in the art and include, for example, hydroxyl, acetoacetoxy, thiol, carboxyl, primary amine, secondary amine, epoxy, anhydride, imino, ketimine, aldimine, silane, aspartate or a suitable combination thereof.

Suitable activators for deprotecting the protected crosslinkable component can include, for example, water, water and acid, organic acids or a combination thereof. In one embodiment, water or a combination of water and acid can be used as an activator to deprotect the crosslinkable component. For example, water or water with acid can be an activator for a coating described in PCT publication WO2005/092934, published on Oct. 6, 2005, wherein water activates hydroxyl groups by hydrolyzing orthoformate groups that block the hydroxyl groups from reacting with crosslinking functional groups.

"Crosslinking component" is a component that includes a compound, oligomer, polymer or copolymer having crosslinking functional groups positioned in each molecule of the compound, oligomer, the backbone of the polymer, pendant from the backbone of the polymer, terminally positioned on the backbone of the polymer, or a combination thereof, wherein these functional groups are capable of crosslinking with the crosslinkable functional groups on the crosslinkable component (during the curing step) to produce a coating in the form of crosslinked structures or networks. One of ordinary skill in the art would recognize that certain crosslinking group/crosslinkable group combinations would be excluded from the present invention, since they would fail to crosslink and produce the film forming crosslinked structures or networks.

Typical crosslinking component can be selected from a compound, oligomer, polymer or copolymer having crosslinking functional groups selected from the group consisting of isocyanate, amine, ketimine, melamine, epoxy, polyacid, anhydride, and a combination thereof. It would be clear to one of ordinary skill in the art that generally certain crosslinking groups from crosslinking components crosslink with certain crosslinkable groups from the crosslinkable components. Some of those paired combinations can include: (1) ketimine crosslinking groups generally crosslink with acetoacetoxy, epoxy, or anhydride crosslinkable groups; (2) isocyanate and melamine crosslinking groups generally crosslink with hydroxyl, primary and secondary amine, ketimine, or aldimine crosslinkable groups; (3) epoxy crosslinking groups generally crosslink with carboxyl, primary and secondary amine, ketimine, or anhydride crosslinkable groups; (4) amine crosslinking groups generally crosslink with acetoacetoxy crosslinkable groups; (5) polyacid crosslinking groups generally crosslink with epoxy crosslinkable groups; and (6) anhydride crosslinking groups generally crosslink with epoxy and ketimine crosslinkable groups.

A coating composition can further comprise a catalyst, an initiator, an activator, a curing agent, or a combination thereof. A coating composition can also comprise a radiation activator if the coating, composition is a radiation curable coating composition, such as a UV curable coating composition.

A catalyst can initiate or promote the reaction between reactants, such as crosslinkable functional groups of a crosslinkable component and crosslinking functional groups of a crosslinking component of a coating composition. The amount of the catalyst depends upon the reactivity of functional groups. Generally, in the range of from about 0.001 percent to about 5 percent, preferably in the range of from 0.01 percent to 2 percent, more preferably in the range of from 0.02 percent to 1 percent, all in weight percent based on the total weight of the crosslinkable component solids, of the catalyst can be utilized. A wide-variety of catalysts can be used, such as, tin compounds, including organotin compounds such as dibutyl tin dilaurate; or tertiary amines, such as, triethylenediamine. These catalysts can be used alone or in conjunction with carboxylic acids, such as, acetic acid. One example of commercially available catalysts is dibutyl tin dilaurate as Fascat® series sold by Arkema, Bristol, Pa., under respective trademark.

An activator can activate one or more components of a coating composition. For example, water can be an activator for a coating described in PCT publication WO2005/092934, published on Oct. 6, 2005, wherein water activates hydroxyl groups by hydrolyzing orthoformate groups that block the hydroxyl groups from reacting with crosslinking functional groups.

An initiator can initiate one or more reactions. Examples can include photo initiators and/or sensitizers that cause photopolymerization or curing of a radiation curable coating composition, such as a UV curable coating composition upon radiation, such as UV irradiation. Many photo initiators are known to those skilled in the art and can be suitable for this invention. Examples of photo initiators can include, but not limited to, benzophenone, benzion, benzionmethyl ether, benzion-n-butyl ether, benzion-iso-butyl ether, propiophenone, acetophenone, methyphenylgloxylate, 1-hydroxycyclohexyl phenyl ketone, 2,2-diethoxyacetophenone, ethylphenylpyloxylate, diphenyl (2,4,6-trimethylbenzoyl)-phosphine oxide, phosphine oxide, phenyl bis(2,4,6-trimethyl benzoyl), phenanthraquinone, and a combination thereof. Other commercial photo initiator products, or a combination thereof, such as Darocure® 1173, Darocure® MBF; Darocure® TPO or Irgacure® 184, Irgacure® 4265, Irgacure® 819, Irgacure® 2022 or Irgacure® 2100 from Ciba Co., can also be suitable. Darocure® and Irgacure® are registered trademarks of Ciba Specialty Chemicals Corporation, New York.

A radiation activator can be activated by radiation and then initiate or catalyze subsequent one or more reactions. One example can be photolatent catalyst available from Ciba Specialty Chemicals.

A curing agent can react with other components of a coating composition to cure the coating composition into a coating. For example, a crosslinking component, such as isocyanate, can be a curing agent for a coating comprising a crosslinkable hydroxyl component. On the other hand, a crosslinkable component can be a curing agent for a crosslinking component.

In conventional coating practice, components of a two-pack coating composition are mixed immediately prior to spraying to form a pot mix which has a limited pot life, wherein said components can include a crosslinking component, a crosslinkable component, necessary catalysts, and other components necessary as determined by those skilled in the art. In addition to the limited pot life, many catalysts can change its activity in the pot mix. For example, some catalysts can be sensitive to the trace amount of water in the pot mix since water can cause hydrolysis and hence inactivation of the catalyst.

To extend pot life, one prior approach is to mix the catalyst with other components of the coating composition immediately prior to spraying. One example is described in aforementioned U.S. Pat. No. 7,201,289 in that a catalyst solution is stored in a separate dispenser and being dispensed and mixed with a liquid coating formulation before the coating formulation is atomized. However, this approach requires mixing the catalyst and the liquid coating composition prior to atomization.

Another example of prior approach is described in U.S. Pat. No. 4,824,017 in that a catalyst and a resin of a coating composition are separately atomized and mixed after atomization. However, such approach requires atomization of two components separately by using separate pumps and individual injection means for each of the two components. This approach also requires intensive adjustment and monitoring of the individual atomization and injection to ensure constant mixing ratio of the two components.

This invention is directed to a spray gun for spraying a coating composition comprising a first component and a second component onto a substrate. The spray gun can comprise:
 (A) a spray gun body (1) comprising a carrier inlet (12) for conveying a carrier, a first inlet (10) connected to a first connection path for conveying the first component, and a second inlet (8) connected to a second connection path for conveying the second component;
 (B) a tubular nozzle casing 55) having a longitudinal casing, axis and a nozzle (13), said tubular nozzle casing being housed within said spray gun body; and
 (C) a spray needle (56) comprising a first spray channel having a longitudinal first channel axis and a first channel opening, and a second spray channel having a longitudinal second channel axis and a second channel opening, said spray needle being housed within said tubular nozzle casing and being configured to slide between a spray position and a closed position, said first channel opening and said second channel opening being positioned adjacent to each other at said nozzle; wherein:
 said longitudinal casing axis, said longitudinal first channel axis and said longitudinal second channel axis are substantially parallel to each other; and
 said first spray channel is configured to connect to said first connection path and said second spray channel is configured to connect to said second connection path, when said spray needle is at said spray position, for conveying said first and said second component separately to said nozzle.

The spray gun body (1) can have additional multiple parts, controls, such as carrier coupling (12) for coupling to a source of a carrier, such as compressed air; a carrier regulator assembly (25) for regulating and measuring flow rate and pressure of the carrier; a coating flow regulator (21) for regulating flow of the first component that is stored in a main reservoir (3), and other mechanisms necessary for proper operation of a spray gun known to those skilled in the art. Additional control for parts can include, such as a trigger (22) and a spray fan regulator (20) for regulating compressed carrier such as compressed air jetting out from a set of shaping air jets (**24*a*) for forming desired spray shape, such as a fan-shape. Typically, multiple channels, connectors, connection paths and mechanical controls can be assembled within the spray gun body. The spray gun body can also provide further assembly or operation mechanisms for additional parts or controls, such as an air cap (24**).

The first inlet (10) can be constructed or configured onto the spray gun body through means known to those skilled in the art. The first inlet is connected to the nozzle for conveying a first component of the coating composition to the nozzle. For a gravity fed spray gun, the main reservoir (3) is not pressurized and the first inlet can be typically positioned at the upper side of the spray gun body so the first component can be conveyed to the first inlet and further into the spray gun by gravity during normal spray operation, such as hand-held spraying.

The tubular nozzle casing (55) can typically be a tubular structure having a longitudinal casing axis and a nozzle (13) at one end of said tubular nozzle casing. The nozzle is typically positioned at muzzle aspect of the spray gun for producing spray stream jetting away from the spray gun. The tubular nozzle casing can be affixed to said spray gun body. In one example, the tubular nozzle casing is casted inside of the spray gun body. In another example, the tubular nozzle casing constructed as part of the spray gun body.

Figure 3:
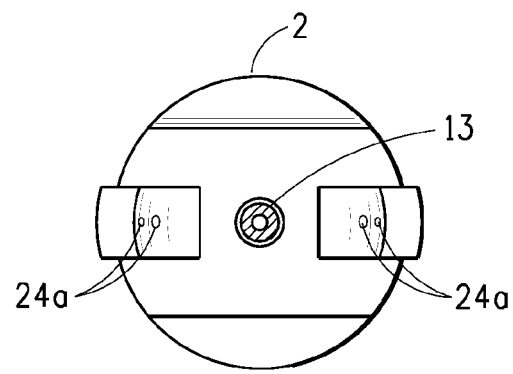
FIG. 3 shows an example of a nozzle-air cap assembly.
Figure 4A:
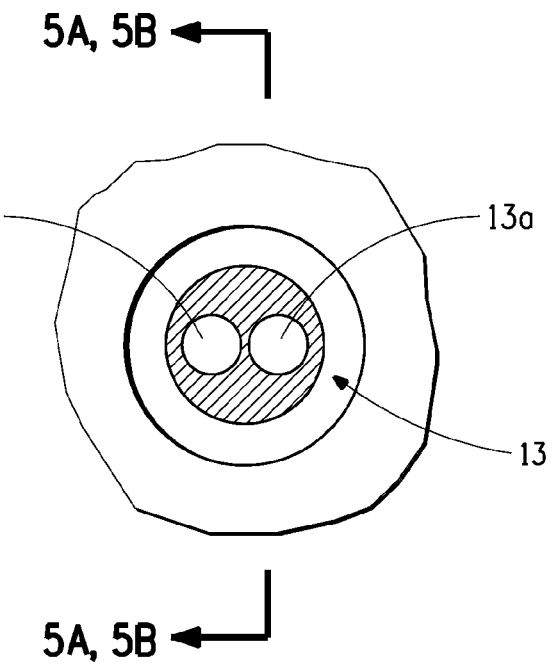
FIG. 4 shows details of frontal views of examples of the spray nozzle. (A) and (B) Two spray channels are configured side-by-side. (C) Two spray channels are configured co-axially.
Figure 4B:
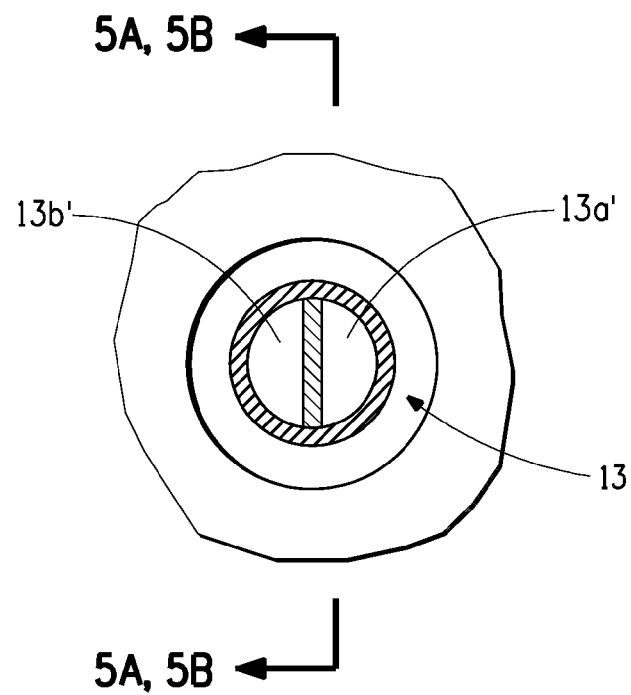
Figure 4C:
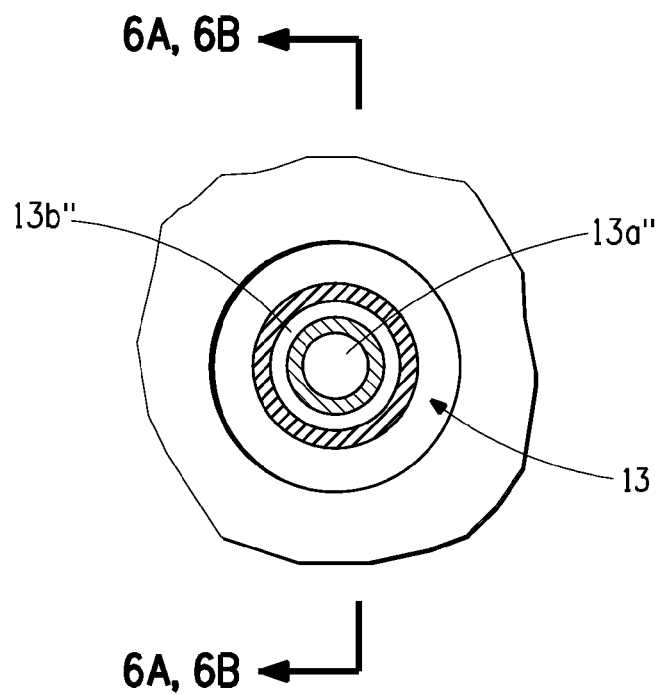

When assembled together, the nozzle (13) and the air cap (24) forms a nozzle-air cap assembly (2). A frontal view is shown in FIG. 3. The first spray channel and the second spray channel can be configured side-by-side (FIGS. 4A and 4B) or co-axial (FIG. 4C) within the tubular nozzle casing. FIG. 4 shows schematic presentations of some of the examples wherein first channel and second openings 13a, 13b, 13a', 13b', 13a" and 13b" are shown (FIGS. 4A, 4B and 4C).

The spray needle (56) can comprise a first spray channel having a longitudinal first channel axis and a first channel opening, and a second spray channel having a longitudinal second channel axis and a second channel opening. The spray needle can be housed within the tubular nozzle casing and can be configured to slide between a spray position and a closed position. The spray needle can typically slide within the tubular nozzle casing along the longitudinal casing axis in the direction (50) as schematically shown in FIGS. 5, 6 and 7. The first channel opening and the second channel opening can be positioned adjacent to each other at the nozzle opening.

Figure 5A:
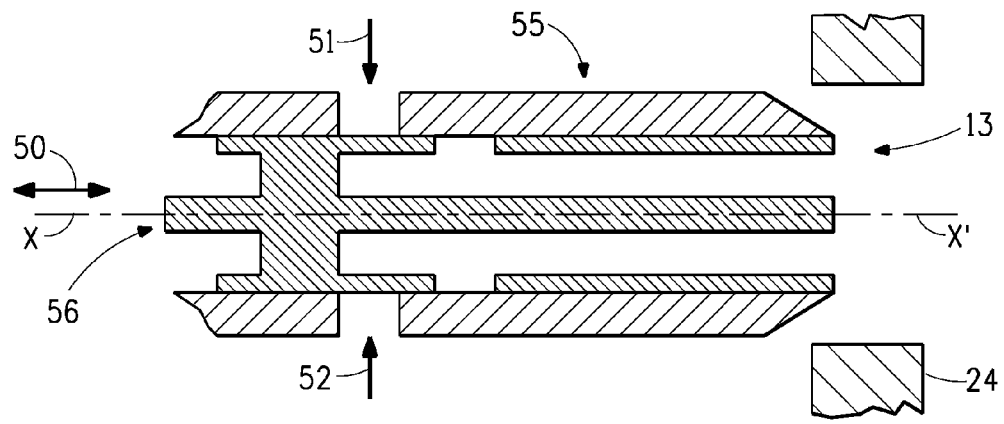
FIG. 5 shows schematic presentations of side cross sectional views of one example of the tubular nozzle casing and spray needle having spray channels. (A) Example of the spray needle at the closed position. (B) Example of the spray needle at the spray position.
Figure 5B:
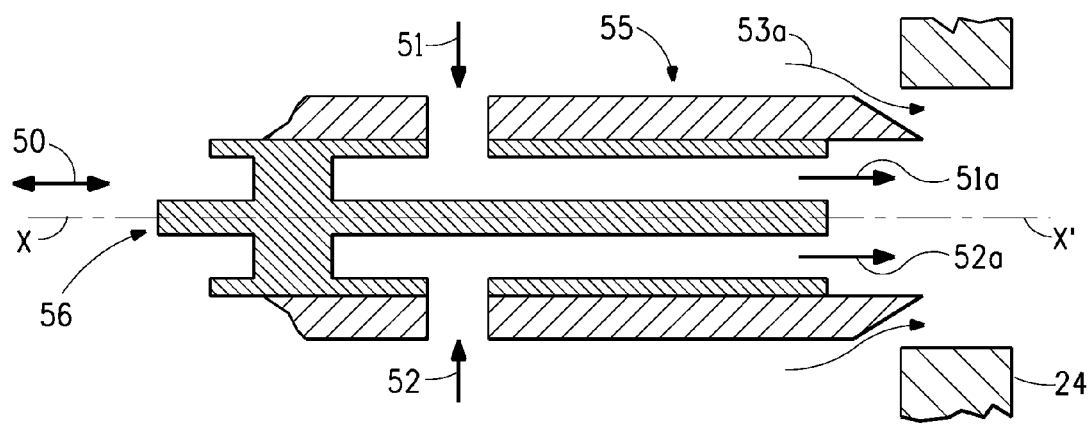

The spray needle can be configured within the tubular nozzle casing so that the longitudinal casing axis, the longitudinal first channel axis and the longitudinal second channel axis are substantially parallel to each other. The term "substantially parallel" means that axes are generally parallel to each other although some portion or parts can have small variation. Typically, the term "substantially parallel" can mean that two or more axes are separated by an equal or almost distance at every point or that two or more axes can be intersecting with the smallest intersecting angle less than 10°. The tubular nozzle axis can be shown as x-x (FIGS. 5A and 5B).

Figure 6A:
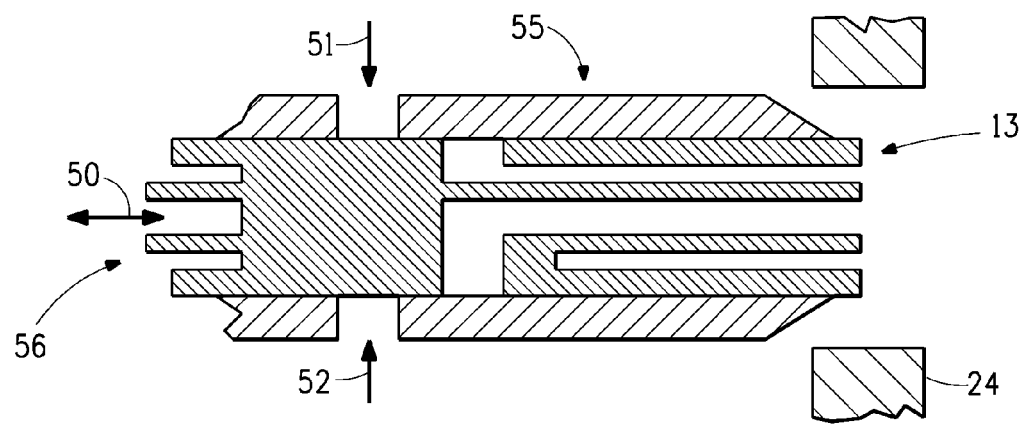
FIG. 6 shows schematic presentations of side cross sectional views of another example of the tubular nozzle casing and spray needle having spray channels. (A) Example of the spray needle at the closed position. (B) Example of the spray needle at the spray position.
Figure 7A:
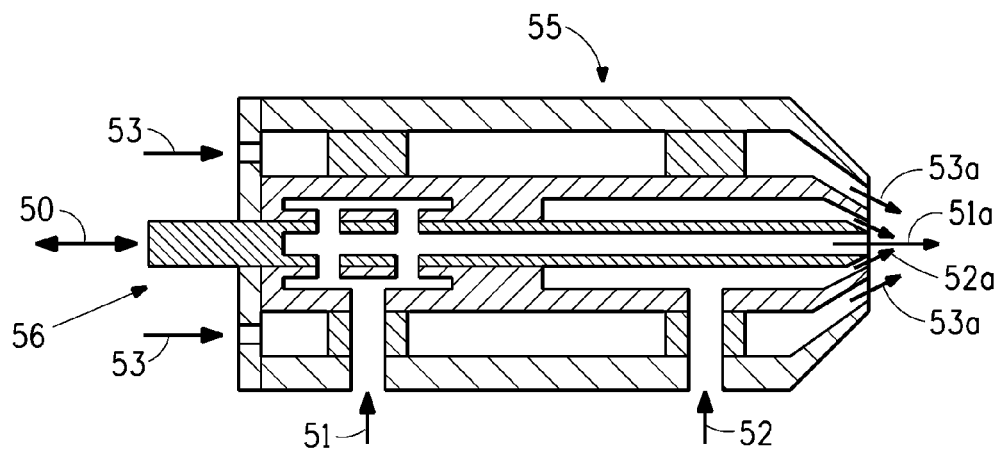
FIG. 7 shows schematic presentations of side cross sectional views of yet another example of the tubular nozzle casing and spray needle having spray channels. (A) Example of the spray needle at the spray position. (B) Example of the spray needle at the closed position.
Figure 7B:
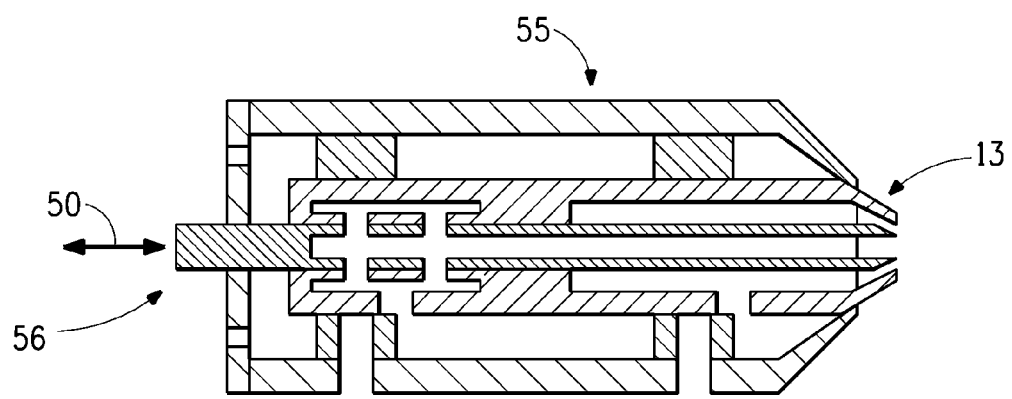
Figure 8A:
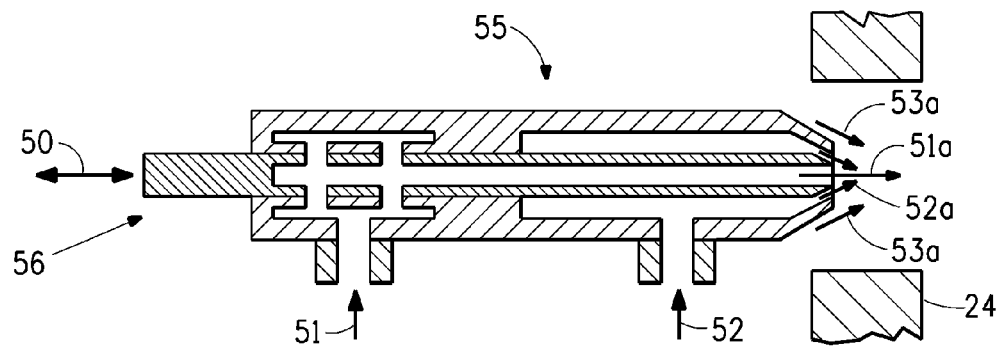
FIG. 8 shows schematic presentations of side cross sectional views of still another example of the tubular nozzle casing and spray needle having spray channels. (A) Example of the spray needle at the spray position. (B) Example of the spray needle at the closed position.
Figure 8B:
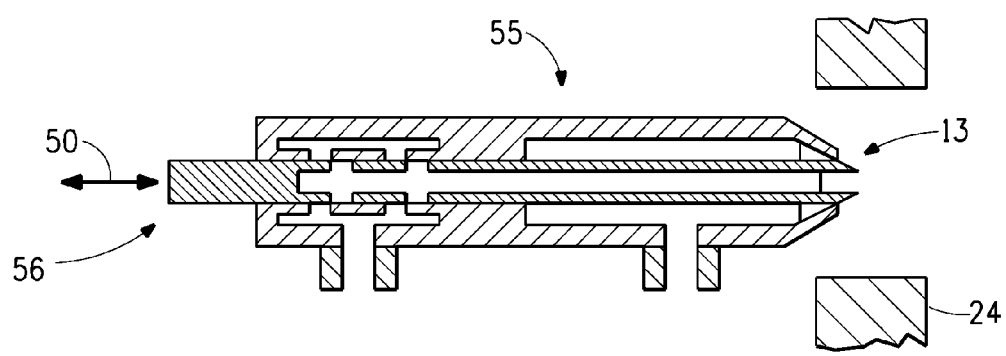

The first spray channel can be configured to connect to the first connection path when the spray needle is at the spray position and to disconnect from the first connection path when the spray needle is at said closed position. In one example, an inlet opening of the first spray channel can be out of alignment with the first connection path so the first component (51) can not flow into the first spray channel when the spray needle is at the closed position (FIGS. 5A, 6A and 7B). The inlet opening of the first spray channel can be aligned with the first connection path so the first component (51) can flow through the first connection path into the first spray channel when the spray needle is at the spray position (FIGS. 5B, 6A and 7A). Flow of the carrier, such as compressed air is schematically shown as 53 and 53a. Flow of the first component and the second component are schematically shown as 51a and 52a, respectively.

Figure 6B:
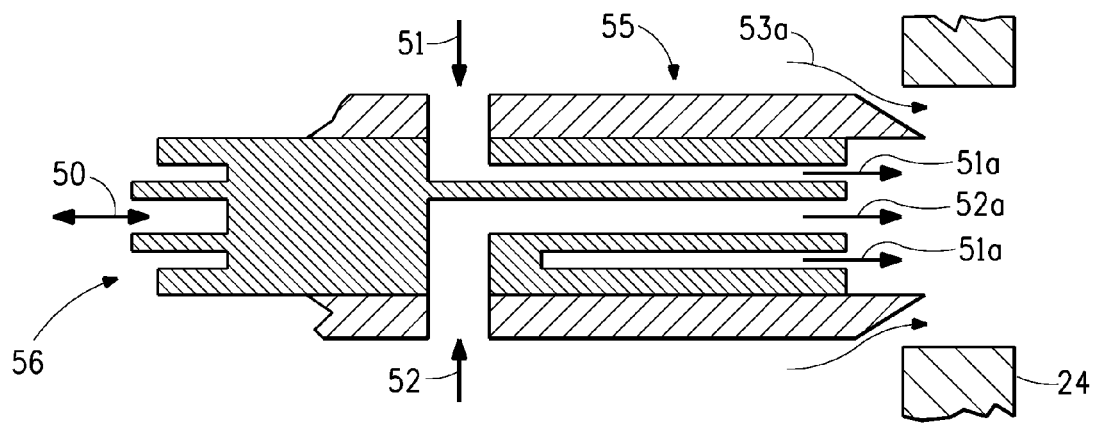

The second spray channel can be configured to connect to the second connection path when the spray needle is at the spray position and to disconnect from the second connection path when the spray needle is at, said closed position. In one example, an inlet opening of the second spray channel can be out of alignment with the second connection path so the second component (52) can not flow into the second spray channel when the spray needle is at the closed position (FIGS. 5A, 6A and 7B). The inlet opening of the second spray channel can be aligned with the second connection path so the second component (52) can flow through the second connection path into the second spray channel when the spray needle is at the spray position (FIGS. 5B, 6B and 7A).

The connections can be configured to synchronize with the spray position and the closed position of the spray needle, such as shown in the FIGS. 5, 6 and 7. The connections can also be configured separately. In one example, the first spray channel can be configured to be constantly connected to the first connection path while the second spray channel is only connected to the second connection path when the spray needle is at the spray position. In another example, the second spray channel can be configured to be constantly connected to the second connection path while the first spray channel is only connected to the first connection path when the spray needle is at the spray position.

The main reservoir (3) can be used for conveying said first component to said first inlet by gravity. The spray gun can have a second reservoir (15) for conveying said second component to the second inlet by gravity.

The spray gun can further comprise a first flow control means coupled to the first inlet for regulating flow of the first component. In one example, the first flow control means is the coating flow regulator (21). In another example, a valve can be attached to the first inlet (10). In yet another example, a restrictor can be inserted or otherwise coupled to the first inlet (10) or in any part of the first connection path to modulate flow of the first component. The spray gun can further comprise a second flow control means coupled to the second inlet for regulating flow of the second component. In one example, a valve can be attached to the second inlet (8). In another example, a restrictor can be inserted or otherwise coupled to the second inlet (8) or in any part of the second connection path to modulate flow of the second component.

The spray gun can have the first spray channel and the second spray channel configured side by side within said tubular nozzle casing. Examples of schematic presentations are shown in FIGS. 4A and 4B. The spray gun can also have the first spray channel and the second spray channel configured co-axially within the tubular nozzle casing. One example of a schematic presentation is shown in FIG. 4C.

The tubular nozzle casing or the spray needle of the spray gun can have a tapered opening at the nozzle. Examples of schematic presentations are shown in FIGS. 7A and 7B. The spray needle of the spray gun can be configured to move in the direction of (50) to open or seal the nozzle. Examples of schematic presentations are shown in FIGS. 7A and 7B, wherein the spray needle is positioned to open the nozzle (FIG. 7A) and to have contact with the tubular nozzle casing sealing off the nozzle or part of the nozzle (FIG. 7B).

This invention is also directed to a method for producing a layer of a coating composition comprising a first component and a second component on a substrate. The method can comprise the steps of:

i) providing a spray gun comprising:
    (A) a spray gun body (1) comprising a carrier inlet (12) for conveying a carrier, a first inlet (10) connected to a first connection path for conveying the first component, and a second inlet (8) connected to a second connection path for conveying the second component;
    (B) a tubular nozzle casing (55) having a longitudinal casing axis and a nozzle (13), said tubular nozzle casing being housed within said spray gun body; and
    (C) a spray needle (56) comprising a first spray channel having a longitudinal first channel axis and a first channel opening, and a second spray channel having a longitudinal second channel axis and a second channel opening, said spray needle being housed within said tubular nozzle casing and being configured to slide between a spray position and a closed position, said first channel opening and said second channel opening being positioned adjacent to each other at said nozzle; wherein:

said longitudinal casing axis, said longitudinal first channel axis and said longitudinal second channel axis are substantially parallel to each other; and said first spray channel is configured to connect to said first connection path and said second spray channel is configured to connect to said second connection path, when said spray needle is at said spray position, for conveying said first and said second component separately to said nozzle;

ii) providing the first component of said coating composition to the first inlet and the second component of said coating composition to said second inlet;

iii) producing atomized said first component and atomized said second component to form an atomized coating mixture by supplying a pressurized carrier to said carrier outlet through said carrier inlet and sliding said spray needle to said spray position; and iv) applying said atomized coating mixture over said substrate forming said layer thereon.

The method can further comprise the step of curing said layer of said coating composition at ambient temperatures, such as in a range of from 18° C. to 35° C., or at elevated temperatures, such as in a range of from 35° C. to 150° C. The layer can be cured for a time period in a range of from a few minutes, such as 5 to 10 minutes, to a few hours, such as 1 to 10 hours, or even to a few days, such as 1 to 2 days. The layer can also be cured by actinic radiation at ambient temperatures, such as in a range of from 18° C. to 35° C., or at elevated temperatures, such as in a range of from 35° C. to 150° C.

The pressurized carrier can be selected from compressed air, compressed gas, compressed gas mixture, or a combination thereof. Typically, a compressed air can be used.

The substrate can be wood, plastic, leather, paper, woven and nonwoven fabrics, metal, plaster, cementitious and asphaltic substrates, and substrates that have one or more existing layers of coating thereon. The substrate can be a vehicle, vehicle body or vehicle parts.

The coating composition can be selected from a lacquer coating composition, a chemical curable coating composition, a radiation curable coating composition, or a chemical and radiation dual-cure coating composition.

The coating composition can be a 1K coating composition or a 2K coating composition. The coating composition can also be a mono-cure such as a chemical curable coating composition or a radiation curable coating composition, or a dual-cure coating composition, such as a chemical and radiation dual-cure coating composition.

In one example, the second component can be selected from a catalyst, an initiator, an activator, a radiation activator, a curing agent, or a combination thereof.

In one example, the coating composition can be a UV coating composition wherein the first component comprises a UV curable component as described above and the second component comprises one or more photo initiators. In another example, the coating composition is a chemical curable coating composition wherein the first component comprises a crosslinkable component and a crosslinking component and the second component comprises a catalyst or a radiation activator such as a latent catalyst such as the photolatent catalyst. In yet another example, the first component comprises a crosslinkable component and the second component comprises a crosslinking component and a catalyst.

In yet another example, the coating composition is a dual-cure coating composition wherein the first component comprises a crosslinkable component, a crosslinking component and a UV curable component, and the second component comprises a catalyst and a photo initiator.

In yet another example, the first component comprises a crosslinkable component and the second component comprises a crosslinking component as a curing agent.

In yet another example, the first component comprises a radiation curable component and a crosslinkable component, and said second component comprises a crosslinking component.

In yet another example, the first component comprises a crosslinkable component, a crosslinking component and a radiation curable component, and said second component comprises a catalyst, a photo initiator, and optionally a radiation activator such as a photolatent catalyst.

In yet another example, the first component is a lacquer coating composition that comprises crosslinkable component. The second component can comprise a crosslinking component or a combination of a crosslinking component and a catalyst. Typically, a lacquer coating composition can dry to form a coating layer and does not require a crosslinking component. Adding an additional crosslinking component can typically reduce curing time and improve coating properties. Conventional method is to mix the lacquer with a crosslinking component in the way similar to the 2 k coating composition. However, such conventional method causes the coating mixture to have limited pot life similar to that of the 2 k coating composition. An advantage of this invention is to have the ability to cure a lacquer composition while maintaining extended pot life since the crosslinking component can be mixed with the lacquer after atomization of the lacquer. The rate of curing can easily be varied by changing the ratio of the lacquer composition to the crosslinking component.

In yet another example, the first component comprises protected crosslinkable groups and a crosslinking component. In one example, the protected crosslinkable groups are selected from the group consisting of amide acetal, orthocarbonate, orthoester, spiroorthoester, orthosilicate, oxazolidine and combinations thereof. In one example, the crosslinking component can comprise a compound, oligomer or polymer having crosslinking groups selected from the group consisting of isocyanate, amine, ketimine, melamine, epoxy, carboxylic acid, anhydride, and a combination thereof. Due to the presence of the protected crosslinkable functional groups, the crosslinkable and the crosslinking groups typically can not initiate crosslinking reaction. The protected crosslinkable groups can be activated by introducing water or water with acid. The water or the water with acid can be used as a second or a subsequent component using the spray gun.

In yet another example, the first component can comprise the aforementioned protected crosslinkable component and the second component can comprise the aforementioned crosslinking component. The water or water in combination with an acid can be used as a subsequent component.

In yet another example, the first component can comprise the aforementioned protected crosslinkable component and the second component can comprise a combination of the crosslinking component, the water or water in combination with an acid.

Another advantage of this invention can include the ability for controlling viscosity of a coating composition. The coating mixture can have a coating viscosity that is increasing upon time, while the first component and the second component, can be at essentially constant individual viscosity. That means that the first component and the second component can be at an individual viscosity essentially constant at the beginning and the end of spray operation. This can be particularly useful for spraying coating compositions that viscosity increases very rapidly all components are mixed together. By utilizing this invention, individual components of such coating compositions can be mixed after atomization. The viscosity of individual component can be essentially constant during spray operation. In one example, the first component comprises a crosslinkable component and a crosslinking component, and the second component comprises a catalyst. In another example, the first component comprises a crosslinkable component and the second component comprises a crosslinking component and a catalyst.

The substrate can be wood, plastic, leather, paper, woven and nonwoven fabrics, metal, plaster, cementitious and asphaltic substrates, and substrates that have one or more existing layers of coating thereon. The substrate can be vehicle body or vehicle parts thereof.

Although coating compositions with multiple coating components are specifically described here, this invention can also be used for a composition having multiple components that need to be mixed to form a mixed composition. With this invention, a first component of the composition can be atomized by a spray device and a second or a subsequent component of the composition can be siphoned into the atomized first component to form the mixed composition.

EXAMPLES

The present invention is further defined in the following Examples. It should be understood that these Examples, while indicating preferred embodiments of the invention, are given by way of illustration only. From the above discussion and these Examples, one skilled in the art can ascertain the essential characteristics of this invention, and without departing from the spirit and scope thereof, can make various changes and modifications of the invention to adapt it to various uses and conditions.

Coating Examples 1-3

DuPont ChromaClear® G2-7779S™, under respective registered or unregistered trademarks, is mixed with an activator 7775S (both available from E. I. duPont de Nemours and Company, Wilmington, USA) according to manufacturer's directions to form a first coating mix, also referred to as a first coating component. The first coating component is placed in the main storage container (also referred to as a first storage container) of a gravity spray gun.

Various catalyst solutions are prepared according to Table 1. Each is used as a second coating component and is placed in a second container of the spray gun.

Mixing ratio of the first coating component/the second coating component is controlled at about 13/1 by selecting a suitable size of a connection tubing connecting the second container and the delivery outlet of the delivery device.

The clearcoats prepared above are sprayed over Uniprime (ED-5000, cold-rolled steel (04×12×032)B952 P60 DIW unpolish Ecoat POWERCRON 590 from ACT Laboratories, Hillsdale, Mich.) to a film thickness of 2.3 to 2.6 mils. The coatings are baked for 5 min or 10 min at 60° C. as indicated.

TABLE 1

Coating Compositions.

| | Example 1 | Example 2 | Example 3 |
| --- | --- | --- | --- |
| First Component | ChromaClear ® G2-7779S ™ mixed with activator 7775S | ChromaClear ® G2-7779S ™ mixed with activator 7775S | ChromaClear ® G2-7779S ™ mixed with activator 7775S |
| Second Component | 0.125% DBTDL in ethyl acetate | 0.125% DBTDL and 2% acetic acid in ethyl acetate | 0.0625% DBTDL, and 0.5% acetic acid in ethyl acetate |

DBTDL = dibutyltin dilaurate.

What is claimed is:

1. A spray gun for spraying a coating composition comprising a first component and a second component, said spray gun comprising:
   (A) a spray gun body comprising a carrier inlet for conveying a carrier, a first inlet connected to a first connection path for conveying the first component, and a second inlet connected to a second connection path for conveying the second component;
   (B) a tubular nozzle casing having a longitudinal casing axis and a nozzle, said tubular nozzle casing being housed within said spray gun body; and
   (C) a spray needle comprising a first spray channel having a longitudinal first channel axis and a first channel opening, and a second spray channel having a longitudinal second channel axis and a second channel opening, said spray needle being housed within said tubular nozzle casing and being configured to slide between a spray position and a closed position, said first channel opening and said second channel opening being positioned adjacent to each other at said nozzle; wherein:
   said longitudinal casing axis, said longitudinal first channel axis and said longitudinal second channel axis are substantially parallel to each other; and
   said first spray channel is configured to connect to said first connection path and said second spray channel is configured to connect to said second connection path, when said spray needle is at said spray position, for conveying said first and said second component separately to said nozzle.

2. The spray gun of clam 1, wherein said first spray channel is configured to disconnect from said first connection path when said spray needle is at said closed position.

3. The spray gun of claim 1, wherein said second spray channel is configured to disconnect from said second connection path when said spray needle is at said closed position.

4. The spray gun of clam 1, wherein said first spray channel is configured to disconnect from said first connection path and said second spray channel is configured to disconnect from said second connection path when said spray needle is at said closed position.

5. The spray gun of claim 1 further comprising a main reservoir for conveying said first component to said first inlet by gravity.

6. The spray gun of claim 1 further comprising a second reservoir for conveying said second component to said second inlet by gravity.

7. The spray gun of claim 1 further comprising a first flow control means coupled to said first inlet for regulating flow of the first component.

8. The spray gun of claim 1 further comprising a second flow control means coupled the second inlet for regulating flow of the second component.

9. The spray gun of claim 1, wherein said first spray channel and said second spray channel are configured side by side within said tubular nozzle casing.

10. The spray gun of claim 1, wherein said first spray channel and said second spray channel are configured co-axially within said tubular nozzle casing.

11. The spray gun of claim 1, wherein said tubular nozzle casing or said spray needle has a tapered opening at the nozzle.

12. The spray gun of claim 1, wherein the spray needle is configured to seal the nozzle at said closed position.

13. The spray gun of claim 1, wherein said first spray channel and said second spray channel are configured co-axially within said spray needle.

* * * * *